US010953377B2

(12) United States Patent
Lattanzio et al.

(10) Patent No.: US 10,953,377 B2
(45) Date of Patent: Mar. 23, 2021

(54) DELTA TEMPERATURE CONTROL OF CATALYTIC DEHYDROGENATION PROCESS REACTORS

(71) Applicant: UOP LLC, Des Plaines, IL (US)

(72) Inventors: Louis A. Lattanzio, Mount Prospect, IL (US); Christopher Schindlbeck, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 254 days.

(21) Appl. No.: 16/215,101

(22) Filed: Dec. 10, 2018

(65) Prior Publication Data

US 2020/0179892 A1    Jun. 11, 2020

(51) Int. Cl.
*B01J 8/00* (2006.01)
*B01J 8/18* (2006.01)
*B01J 19/00* (2006.01)

(52) U.S. Cl.
CPC ........... *B01J 8/1836* (2013.01); *B01J 8/0015* (2013.01); *B01J 8/1809* (2013.01); *B01J 2208/00044* (2013.01)

(58) Field of Classification Search
CPC ... B01J 8/00; B01J 8/001; B01J 8/0015; B01J 8/18; B01J 8/1809; B01J 8/1836; B01J 19/00; B01J 19/0006; B01J 19/0013; B01J 2208/00; B01J 2208/00008; B01J 2208/00017; B01J 2208/00026; B01J 2208/00035; B01J 2208/00044; B01J 2208/00061; B01J 2219/00; B01J 2219/00049; B01J 2219/00191; B01J 2219/00195; B01J 2219/00198; B01J 2219/00202; B01J 2219/00211; (Continued)

(56) References Cited

U.S. PATENT DOCUMENTS 4,159,239 A    6/1979   Schwartz ...................... 208/113
4,267,458 A    5/1981   Uram ........................... 290/40 R
(Continued)

FOREIGN PATENT DOCUMENTS

EP    0181744 A1    5/1986    ............ B65G 53/66
EP    2746884 A1    6/2014    ............ G05B 23/02
(Continued)

OTHER PUBLICATIONS

Bespalov A. V. et al., Control systems of chemical and technological processes, pp. 508-509 (2001) (Russian).
(Continued)

*Primary Examiner* — Natasha E Young

(57) ABSTRACT

A chemical plant or a petrochemical plant or a refinery may include one or more pieces of equipment that process one or more input chemicals to create one or more products. For example, catalytic dehydrogenation can be used to convert paraffins to the corresponding olefin. A delta temperature controller may determine and control differential temperature across the reactor, and use a delta temperature to control a set point for a heater temperature controller. By doing so, the plant may ramp up a catalytic dehydrogenation unit faster and ensure it does not coke up the catalyst and/or foul a screens too quickly. Catalyst activity may be taken into account and allow the plant to have better control over production and run length of the unit.

20 Claims, 9 Drawing Sheets

(58) Field of Classification Search
CPC ...... B01J 2219/0022; B01J 2219/00222; B01J
2219/00225; B01J 2219/00227; B01J
2219/00245; B01J 2219/00247
See application file for complete search history.

(56) References Cited

U.S. PATENT DOCUMENTS

| | | | |
|---|---|---|---|
| 4,284,494 A | 8/1981 | Bartholic | 208/164 |
| 4,362,614 A | 12/1982 | Asdigian | 208/235 |
| 4,380,146 A | 4/1983 | Yannone | 60/39.281 |
| 4,385,985 A | 5/1983 | Gross | 208/113 |
| 4,411,773 A | 10/1983 | Gross | 208/159 |
| 4,709,546 A | 12/1987 | Weiler | 415/116 |
| 4,775,460 A | 10/1988 | Reno | |
| 4,795,545 A | 1/1989 | Schmidt | |
| 4,902,469 A | 2/1990 | Watson | 376/216 |
| 5,077,252 A | 12/1991 | Owen et al. | 502/43 |
| 5,227,121 A | 7/1993 | Scarola | 340/525 |
| 5,582,684 A | 12/1996 | Holmqvist et al. | 162/49 |
| 5,605,435 A | 2/1997 | Haugen | 137/514 |
| 5,616,214 A | 4/1997 | Leclerc | 162/49 |
| 5,642,296 A | 6/1997 | Saxena | 216/84 |
| 5,666,297 A | 9/1997 | Britt et al. | 364/578 |
| 5,817,517 A | 10/1998 | Perry et al. | 436/55 |
| 6,038,540 A | 3/2000 | Krist et al. | 705/8 |
| 6,081,230 A | 6/2000 | Hoshino | 342/357.32 |
| 6,230,486 B1 | 5/2001 | Yasui | 123/674 |
| 6,266,605 B1 | 7/2001 | Yasui | 60/276 |
| 6,271,845 B1 | 8/2001 | Richardson | 715/764 |
| 6,392,114 B1 | 5/2002 | Shields et al. | 582/719 |
| 6,521,808 B1 * | 2/2003 | Ozkan | B01J 21/063 502/234 |
| 6,760,716 B1 | 7/2004 | Ganesamoorthi et al. | 706/21 |
| 6,772,044 B1 | 8/2004 | Mathur et al. | 700/204 |
| 6,795,798 B2 | 9/2004 | Eryurek et al. | 702/188 |
| 6,982,032 B2 | 1/2006 | Shaffer et al. | 210/101 |
| 6,983,227 B1 | 1/2006 | Thalhammer-Reyero | |
| 7,006,889 B2 | 2/2006 | Mathur et al. | 700/204 |
| 7,067,333 B1 | 6/2006 | Pasadyn et al. | 438/5 |
| 7,133,807 B2 | 11/2006 | Karasawa | 702/188 |
| 7,151,966 B1 | 12/2006 | Baier et al. | 700/19 |
| 7,246,039 B2 | 7/2007 | Moorhouse | 702/185 |
| 7,313,447 B2 | 12/2007 | Hsuing et al. | 700/9 |
| 7,415,357 B1 | 8/2008 | Stluka et al. | 702/6 |
| 7,567,887 B2 | 7/2009 | Emigholz et al. | 702/182 |
| 7,742,833 B1 | 6/2010 | Herbst et al. | 700/108 |
| 7,836,941 B2 | 11/2010 | Song et al. | |
| 7,877,596 B2 | 1/2011 | Foo Kune et al. | 713/153 |
| 7,925,979 B2 | 4/2011 | Forney et al. | 715/733 |
| 7,936,878 B2 | 5/2011 | Kune et al. | 380/270 |
| 7,979,192 B2 | 7/2011 | Morrison et al. | |
| 7,995,526 B2 | 8/2011 | Liu et al. | 370/329 |
| 8,050,889 B2 | 11/2011 | Fluegge et al. | 702/182 |
| 8,055,371 B2 | 11/2011 | Sanford et al. | 700/108 |
| 8,111,619 B2 | 2/2012 | Liu et al. | 370/229 |
| 8,128,808 B2 | 3/2012 | Hassan et al. | 208/209 |
| 8,200,423 B2 * | 6/2012 | Dietsch | G01C 21/20 701/409 |
| 8,204,717 B2 | 6/2012 | McLaughlin et al. | 702/188 |
| 8,244,384 B2 | 8/2012 | Pachner et al. | 700/30 |
| 8,280,057 B2 | 10/2012 | Budampati et al. | 380/270 |
| 8,352,049 B2 | 1/2013 | Hsiung et al. | |
| 8,354,081 B2 | 1/2013 | Wheat et al. | |
| 8,385,436 B2 | 2/2013 | Holm et al. | 375/260 |
| 8,428,067 B2 | 4/2013 | Budampati et al. | 370/395.21 |
| 8,458,778 B2 | 6/2013 | Budampati et al. | 726/6 |
| 8,571,064 B2 | 10/2013 | Kore et al. | 370/469 |
| 8,630,962 B2 | 1/2014 | Maeda | 706/12 |
| 8,644,192 B2 | 2/2014 | Budampati et al. | 370/255 |
| 8,811,231 B2 | 8/2014 | Budampati et al. | 370/255 |
| 8,815,152 B2 | 8/2014 | Burgess et al. | |
| 8,923,882 B2 | 12/2014 | Gandhi et al. | 455/455 |
| 8,926,737 B2 | 1/2015 | Chatterjee et al. | |
| 9,053,260 B2 | 6/2015 | Romatier et al. | |
| 9,134,717 B2 | 9/2015 | Trnka | |
| 9,166,667 B2 | 10/2015 | Thanikachalam | |
| 9,176,498 B2 | 11/2015 | Baramov | |
| 9,354,631 B2 | 5/2016 | Mohideen et al. | |
| 9,571,919 B2 | 2/2017 | Zhang et al. | |
| 9,580,341 B1 | 2/2017 | Brown et al. | C02F 3/006 |
| 9,751,817 B2 | 9/2017 | Jani et al. | |
| 9,864,823 B2 | 1/2018 | Horn et al. | |
| 9,968,899 B1 | 5/2018 | Gellaboina et al. | |
| 10,095,200 B2 | 10/2018 | Horn et al. | |
| 10,107,295 B1 | 10/2018 | Brecheisen | |
| 10,180,680 B2 | 1/2019 | Horn et al. | |
| 10,183,266 B2 | 1/2019 | Victor et al. | |
| 10,222,787 B2 | 3/2019 | Romatier et al. | |
| 10,328,408 B2 | 6/2019 | Victor et al. | |
| 2002/0123864 A1 | 9/2002 | Eryurek et al. | 702/188 |
| 2002/0179495 A1 | 12/2002 | Heyse et al. | 208/137 |
| 2003/0036052 A1 | 2/2003 | Delwiche et al. | 435/4 |
| 2003/0105775 A1 | 6/2003 | Shimada | |
| 2003/0147351 A1 | 8/2003 | Greenlee | 370/232 |
| 2003/0223918 A1 | 12/2003 | Cammy | 422/144 |
| 2004/0079392 A1 | 4/2004 | Kuechler | 134/22.19 |
| 2004/0099572 A1 | 5/2004 | Evans | 208/113 |
| 2004/0109788 A1 | 6/2004 | Li et al. | 422/3 |
| 2004/0122273 A1 | 6/2004 | Kabin | 585/639 |
| 2004/0122936 A1 | 6/2004 | Mizelle et al. | |
| 2004/0147036 A1 | 7/2004 | Krenn et al. | 436/119 |
| 2004/0148144 A1 | 7/2004 | Martin | |
| 2004/0204775 A1 | 10/2004 | Keyes | 705/30 |
| 2004/0204913 A1 | 10/2004 | Mueller et al. | |
| 2004/0220689 A1 | 11/2004 | Mathur et al. | 700/97 |
| 2004/0220778 A1 | 11/2004 | Imai et al. | 702/188 |
| 2005/0027721 A1 | 2/2005 | Saenz | 707/100 |
| 2005/0029163 A1 | 2/2005 | Letzsch | 208/113 |
| 2005/0009033 A1 | 5/2005 | Mallavarapu et al. | 95/96 |
| 2005/0133211 A1 | 6/2005 | Osborn et al. | |
| 2005/0216209 A1 | 9/2005 | Evans | 702/45 |
| 2006/0020423 A1 | 1/2006 | Sharpe, Jr. | 702/183 |
| 2006/0133412 A1 | 6/2006 | Callaghan | 370/465 |
| 2006/0252642 A1 | 11/2006 | Kanazirev | |
| 2006/0259163 A1 | 11/2006 | Hsiung et al. | 700/30 |
| 2007/0020154 A1 | 1/2007 | Evans | 422/139 |
| 2007/0059159 A1 | 3/2007 | Hjerpe | 415/117 |
| 2007/0059838 A1 | 3/2007 | Morrison et al. | 436/55 |
| 2007/0091824 A1 | 4/2007 | Budampati et al. | 370/255 |
| 2007/0091825 A1 | 4/2007 | Budampati et al. | 370/255 |
| 2007/0185664 A1 | 8/2007 | Tanaka | 702/56 |
| 2007/0192078 A1 | 8/2007 | Nasle et al. | 703/14 |
| 2007/0212790 A1 | 9/2007 | Welch et al. | 436/139 |
| 2007/0250292 A1 | 10/2007 | Alagappan et al. | 702/184 |
| 2007/0260656 A1 | 11/2007 | Wiig | |
| 2007/0271452 A1 | 11/2007 | Foo Kune et al. | 713/150 |
| 2008/0086322 A1 | 4/2008 | Wallace | 705/1 |
| 2008/0130902 A1 | 6/2008 | Foo Kune et al. | 380/286 |
| 2008/0154434 A1 | 6/2008 | Galloway et al. | |
| 2008/0217005 A1 | 9/2008 | Stluka et al. | 166/250.01 |
| 2008/0282606 A1 | 11/2008 | Plaza et al. | |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0204245 A1 | 8/2009 | Sustaeta | 700/99 |
| 2009/0245286 A1 | 10/2009 | Kore et al. | 370/475 |
| 2009/0268674 A1 | 10/2009 | Liu et al. | 370/329 |
| 2009/0281677 A1 | 11/2009 | Botich | 700/295 |
| 2010/0014599 A1 | 1/2010 | Holm et al. | 375/260 |
| 2010/0108567 A1 | 5/2010 | Medoff | 208/49 |
| 2010/0125347 A1 | 5/2010 | Martin et al. | 700/31 |
| 2010/0152900 A1 | 6/2010 | Gurciullo et al. | |
| 2010/0158764 A1 | 6/2010 | Hedrick | 422/134 |
| 2010/0230324 A1 | 9/2010 | Al-Alloush et al. | 208/82 |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | 705/7.25 |
| 2012/0083933 A1 | 4/2012 | Subbu et al. | 700/291 |
| 2012/0095808 A1 | 4/2012 | Kattapuram et al. | 705/7.37 |

(56) References Cited

U.S. PATENT DOCUMENTS

| | | | |
|---|---|---|---|
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0259583 A1 | 10/2012 | Noboa et al. | |
| 2013/0029587 A1 | 1/2013 | Gandhi et al. | 455/7 |
| 2013/0031960 A1 | 2/2013 | Delrahim | 73/40.5 R |
| 2013/0079899 A1 | 3/2013 | Baramov | 700/32 |
| 2013/0090088 A1 | 4/2013 | Chevsky et al. | 455/411 |
| 2013/0094422 A1 | 4/2013 | Thanikachalam | 370/312 |
| 2013/0172643 A1 | 7/2013 | Pradeep | 585/310 |
| 2013/0253898 A1 | 9/2013 | Meagher et al. | 703/18 |
| 2013/0270157 A1 | 10/2013 | Ferrara | 208/48 AA |
| 2013/0311437 A1 | 11/2013 | Stluka et al. | 707/706 |
| 2013/0327052 A1 | 12/2013 | O'Neill | 60/772 |
| 2014/0008035 A1 | 1/2014 | Patankar et al. | |
| 2014/0026598 A1 | 1/2014 | Trawicki | 62/56 |
| 2014/0074273 A1 | 3/2014 | Mohideen et al. | 700/98 |
| 2014/0114039 A1 | 4/2014 | Benham et al. | 526/348.5 |
| 2014/0131027 A1 | 5/2014 | Chir | 165/300 |
| 2014/0163275 A1 | 6/2014 | Yanagawa et al. | 585/319 |
| 2014/0179968 A1 | 6/2014 | Yanagawa et al. | 585/476 |
| 2014/0212978 A1 | 7/2014 | Sharpe, Jr. et al. | 436/6 |
| 2014/0294683 A1 | 10/2014 | Siedler | 422/129 |
| 2014/0294684 A1 | 10/2014 | Siedler | 422/129 |
| 2014/0296058 A1 | 10/2014 | Sechrist et al. | 502/53 |
| 2014/0309756 A1 | 10/2014 | Trygstad | 700/31 |
| 2014/0337256 A1 | 11/2014 | Varadi et al. | 706/12 |
| 2014/0337277 A1 | 11/2014 | Asenjo et al. | |
| 2015/0059714 A1 | 3/2015 | Bernards | 123/568.11 |
| 2015/0060331 A1 | 3/2015 | Sechrist et al. | |
| 2015/0077263 A1 | 3/2015 | Ali et al. | 340/679 |
| 2015/0078970 A1 | 3/2015 | Iddir et al. | 422/218 |
| 2015/0098862 A1 | 4/2015 | Lok et al. | 422/49 |
| 2015/0158789 A1 | 6/2015 | Keusenkothen | |
| 2015/0185716 A1 | 7/2015 | Wichmann et al. | 700/287 |
| 2015/0276208 A1 | 10/2015 | Maturana et al. | 700/274 |
| 2015/0284641 A1 | 10/2015 | Shi | 208/113 |
| 2015/0330571 A1 | 11/2015 | Beuneken | 141/4 |
| 2016/0033941 A1 | 2/2016 | T et al. | 700/81 |
| 2016/0048119 A1 | 2/2016 | Wojsznis | 700/11 |
| 2016/0098037 A1 | 4/2016 | Zornio et al. | 700/20 |
| 2016/0098234 A1 | 4/2016 | Weaver | 358/1.15 |
| 2016/0122663 A1 | 5/2016 | Pintart et al. | |
| 2016/0147204 A1 | 5/2016 | Wichmann et al. | 700/287 |
| 2016/0237910 A1 | 8/2016 | Saito | |
| 2016/0260041 A1 | 9/2016 | Horn et al. | |
| 2016/0291584 A1 | 10/2016 | Horn et al. | |
| 2016/0292188 A1 | 10/2016 | Horn et al. | |
| 2016/0292325 A1 | 10/2016 | Horn et al. | |
| 2016/0313653 A1 | 10/2016 | Mink | |
| 2016/0363315 A1 | 12/2016 | Colannino et al. | |
| 2017/0009932 A1 | 1/2017 | Oh | |
| 2017/0058213 A1 | 3/2017 | Oprins | 585/303 |
| 2017/0082320 A1 | 3/2017 | Wang | |
| 2017/0107188 A1 | 4/2017 | Kawaguchi | |
| 2017/0284410 A1 | 10/2017 | Sharpe, Jr. | |
| 2017/0315543 A1 | 11/2017 | Horn et al. | |
| 2017/0323038 A1 | 11/2017 | Horn et al. | |
| 2017/0352899 A1 | 12/2017 | Asai | |
| 2018/0046155 A1 | 2/2018 | Horn et al. | |
| 2018/0081344 A1 | 3/2018 | Romatier et al. | |
| 2018/0082569 A1 | 3/2018 | Horn et al. | |
| 2018/0121581 A1 | 5/2018 | Horn et al. | |
| 2018/0122021 A1 | 5/2018 | Horn et al. | |
| 2018/0155638 A1 | 6/2018 | Al-Ghamdi | 208/79 |
| 2018/0155642 A1 | 6/2018 | Al-Ghamdi et al. | |
| 2018/0197350 A1 | 7/2018 | Kim | |
| 2018/0275690 A1 | 9/2018 | Lattanzio et al. | |
| 2018/0275691 A1 | 9/2018 | Lattanzio et al. | |
| 2018/0275692 A1 | 9/2018 | Lattanzio et al. | |
| 2018/0280914 A1 | 10/2018 | Victor et al. | |
| 2018/0280917 A1 | 10/2018 | Victor et al. | |
| 2018/0282633 A1 | 10/2018 | Van de Cotte et al. | |
| 2018/0282634 A1 | 10/2018 | Van de Cotte et al. | |
| 2018/0282635 A1 | 10/2018 | Van de Cotte et al. | |
| 2018/0283368 A1 | 10/2018 | Van de Cotte et al. | |
| 2018/0283392 A1 | 10/2018 | Van de Cotte et al. | |
| 2018/0283404 A1 | 10/2018 | Van de Cotte et al. | |
| 2018/0283811 A1 | 10/2018 | Victor et al. | |
| 2018/0283812 A1 | 10/2018 | Victor et al. | |
| 2018/0283813 A1 | 10/2018 | Victor et al. | |
| 2018/0283815 A1 | 10/2018 | Victor et al. | |
| 2018/0283816 A1 | 10/2018 | Victor et al. | |
| 2018/0283818 A1 | 10/2018 | Victor et al. | |
| 2018/0284705 A1 | 10/2018 | Van de Cotte et al. | |
| 2018/0286141 A1 | 10/2018 | Van de Cotte et al. | |
| 2018/0311605 A1 | 11/2018 | McCool et al. | |
| 2018/0362862 A1 | 12/2018 | Gellaboina et al. | |
| 2018/0363914 A1 | 12/2018 | Faiella et al. | |
| 2018/0364747 A1 | 12/2018 | Charr et al. | |
| 2019/0002318 A1 | 1/2019 | Thakkar et al. | |
| 2019/0003978 A1 | 1/2019 | Shi et al. | |
| 2019/0015806 A1 | 1/2019 | Gellaboina et al. | |
| 2019/0041813 A1 | 2/2019 | Horn et al. | |
| 2019/0083920 A1 | 3/2019 | Bjorklund et al. | |
| 2019/0101336 A1 | 4/2019 | Victor et al. | |
| 2019/0101342 A1 | 4/2019 | Victor et al. | |
| 2019/0101907 A1 | 4/2019 | Charr et al. | |
| 2019/0102966 A1 | 4/2019 | Lorenz | |
| 2019/0108454 A1 | 4/2019 | Banerjee et al. | |
| 2019/0120810 A1 | 4/2019 | Kumar KN et al. | |
| 2019/0151814 A1 | 5/2019 | Victor et al. | |
| 2019/0155259 A1 | 5/2019 | Romatier et al. | |

FOREIGN PATENT DOCUMENTS

| | | | | |
|---|---|---|---|---|
| EP | 2801937 A1 | 11/2014 | | G06Q 10/06 |
| GB | 1134439 A | 11/1968 | | G01N 31/22 |
| WO | WO 1990/010083 A1 | 9/1990 | | C12Q 1/04 |
| WO | WO 2001/060951 A1 | 8/2001 | | C10G 51/04 |
| WO | WO 2006/044408 A1 | 4/2006 | | F23D 14/72 |
| WO | WO 2007/095585 A2 | 8/2007 | | A61K 31/721 |
| WO | WO 2009/046095 A1 | 4/2009 | | G06F 11/00 |
| WO | WO 2014/042508 A1 | 3/2014 | | G06Q 50/04 |
| WO | WO 2014/123993 A1 | 8/2014 | | G06F 17/00 |
| WO | WO 2016/141128 A1 | 9/2016 | | G06Q 10/06 |
| WO | WO 2017/079058 A1 | 5/2017 | | B01D 1/14 |

OTHER PUBLICATIONS

Daniel Goebel, Dry Gas Seal Contamination During Operation and Pressurization Hold, [online], Feb. 2016, [retrieved on Jun. 19, 2019]. Retrieved from <https ://core.ac.uk/download/pdf/84815277. pdf> (Year: 2016).

EnergyMEDOR®, Product brochure (Nov. 2014).

Chistof Huber, Density and Concentration Measurement Application for Novel MEMS-based Micro Densitometer for Gas, [online], 2016, [retrieved on Jun. 19, 2019]. Retrieved from <https://www.ama-science.org/proceedings/getFile/ZwZ1 BD==> (Year: 2016).

Lotters, Real-time Composition Determination of Gas Mixtures, [online], 2015, [retrieved on Jun. 19, 2019]. Retrieved from <https://www.ama-science.org/proceedings/getFile/ZwNOZj==> (Year: 2015).

Maybeck, Peter S., "Stochastic models, estimation, and control," vol. 1, Academic Press (1979), 19 pages.

\* cited by examiner

|  | Target Reactor dT | Operating Variables | | |
|---|---|---|---|---|
|  |  | Reactor dT | RIT | Coke |
| Reactor 1 |  |  |  |  |
| Reactor 2 |  |  |  |  |
| Reactor 3 |  |  |  |  |
| Reactor 4 |  |  |  |  |

FIG. 5

DELTA TEMPERATURE CONTROL OF CATALYTIC DEHYDROGENATION PROCESS REACTORS

FIELD

The present disclosure is related to a method and system for managing the operation of a plant, such as a chemical plant or a petrochemical plant or a refinery, and more particularly to a method for improving the performance of components that make up operations in a plant. Typical plants may be those that provide catalytic dehydrogenation.

BACKGROUND

In a carbonaceous processing plant, a number of different factors may impact plant efficiency. By improving one or more of these factors, plant efficiency may be improved. There will always be a need to improve plant efficiency, which may lead to longer plant life, a smaller environmental impact, and more effective use of resources.

SUMMARY

The following summary presents a simplified summary of certain features. The summary is not an extensive overview and is not intended to identify key or critical elements.

One or more embodiments may include a system comprising: at least two sensors configured to measure operating information in a catalytic reactor unit, wherein the at least two sensors comprise at least one reactor inlet temperature sensor and at least one reactor outlet temperature sensor; a data collection platform, a data analysis platform, and/or a control platform. The data collection platform may include one or more processors of the data collection platform; and memory of the data collection platform, storing computer-readable instructions that, when executed, cause the data collection platform to: receive sensor data collected by the at least two sensors, the sensor data comprising reactor inlet temperature data and reactor outlet temperature data; correlate the sensor data with metadata comprising time data; and transmit the sensor data. The data analysis platform may include one or more processors of the data analysis platform; and memory of the data analysis platform, storing computer-readable instructions that, when executed, cause the data analysis platform to: receive the sensor data from the data collection platform; use the sensor data to determine a delta temperature (delta T) based on the reactor inlet temperature data and reactor outlet temperature data; and based on the delta temperature, transmit a command for an adjustment to an operating temperature of a heater of the catalytic reactor unit. The control platform may include one or more processors of the control platform; and memory of the control platform, storing computer-readable instructions that, when executed, cause the control platform to: receive the command for the adjustment to the operating temperature of the heater of the catalytic reactor unit; and adjust the operating temperature of the heater of the catalytic reactor unit.

One or more embodiments may include a method comprising: receiving, by a data analysis computing device, sensor data collected by at least two sensors associated with a reactor unit, the sensors comprising at least one reactor inlet temperature sensor and at least one reactor outlet temperature sensor; based on the sensor data, determining, by the data analysis computing device, a current delta temperature representing a difference between a reactor inlet temperature of the reactor unit and a reactor outlet temperature of the reactor unit; determining, by the data analysis computing device, a difference between the current delta temperature and a design delta temperature of the reactor unit; based on the sensor data, determining, by the data analysis computing device, a recommended adjustment to the reactor inlet temperature of the reactor unit to reduce the difference between the current delta temperature and the design delta temperature; generating a display of the difference between the current delta temperature and the design delta temperature on a dashboard, the dashboard comprising a display of the recommended adjustment to the reactor inlet temperature of the reactor unit; and sending a command configured to cause the recommended adjustment to the reactor inlet temperature of the reactor unit.

One or more embodiments may include a method of controlling a dehydrogenation reaction in a reactor during ramp up after addition of fresh catalyst, the method comprising: determining, by a data analysis device comprising a processor and memory, a desired product yield for a reaction of a reactant associated with the reactor; based on the desired product yield, calculating, by the data analysis device, a desired difference between a reactor inlet temperature of the reactant associated with the reactor and a reactor outlet temperature of a product at an outlet of the reactor; initiating, by the data analysis device, a ramp up process for the reactor by setting the reactor inlet temperature to a preset value; receiving, by the data analysis device, measurement information comprising the reactor outlet temperature of the product at the outlet of the reactor; calculating, by the data analysis device, an actual difference between the reactor inlet temperature and the reactor outlet temperature; and after determining that the actual difference between the reactor inlet temperature and the reactor outlet temperature is not the desired difference between the reactor inlet temperature and the reactor outlet temperature, sending, by the data analysis device, a command configured to cause a reaction condition of the reactor to obtain the desired difference between the reactor inlet temperature and the reactor outlet temperature.

The foregoing and other aspects and features of the present disclosure will become apparent to those of reasonable skill in the art from the following detailed description, as considered in conjunction with the accompanying drawings.

BRIEF DESCRIPTION OF DRAWINGS

The present disclosure is illustrated by way of example and not limited in the accompanying figures in which like reference numerals indicate similar elements and in which:

FIG. 5 depicts an illustrative example of a dashboard that may be used in a dehydrogenation process in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A chemical plant or a petrochemical plant or a refinery may include one or more pieces of equipment that process one or more input chemicals to create one or more products. For example, catalytic dehydrogenation can be used to convert paraffins to the corresponding olefin, e.g., propane to propylene, or isobutane to isobutylene, or Propane and isobutane to propylene and isobutylene.

Conversion may be adjusted by increasing or decreasing the reactor inlet temperatures.

The present disclosure may allow plants to ramp up a catalytic dehydrogenation unit faster and ensure they do not coke up the catalyst and/or foul their screens too quickly. This disclosure may take into account catalyst activity and allow the plant to have better control over production and run length of the unit. It may also help with operating the unit closer to the optimum conditions. This disclosure also may allow for better control over the conversion in each reactor and allow for ramping up and ramping down the unit while maintaining an optimum delta temperature profile.

In one or more embodiments, an existing temperature differential indicator (TDI) may be converted to a delta temperature controller that may control the differential temperature across the reactor. The delta temperature controller may then send remote set point to heater temperature controllers. The remote set point may be sent to the heater outlet temperature controllers. For a single cell design, the output may go to the single heater outlet temperature controller. For the dual zone design, the output may be distributed to both outlet temperature controllers.

In one or more embodiments, the delta temperature profile may be automatically predicted based on the desired production rate and the plant may then be able to adjust actual delta temperatures to target a recommended profile. This may allow the plant to minimize feed consumption as well as screen fouling.

These and other features will be described in more detail in connection with the description below.

Figure 1:
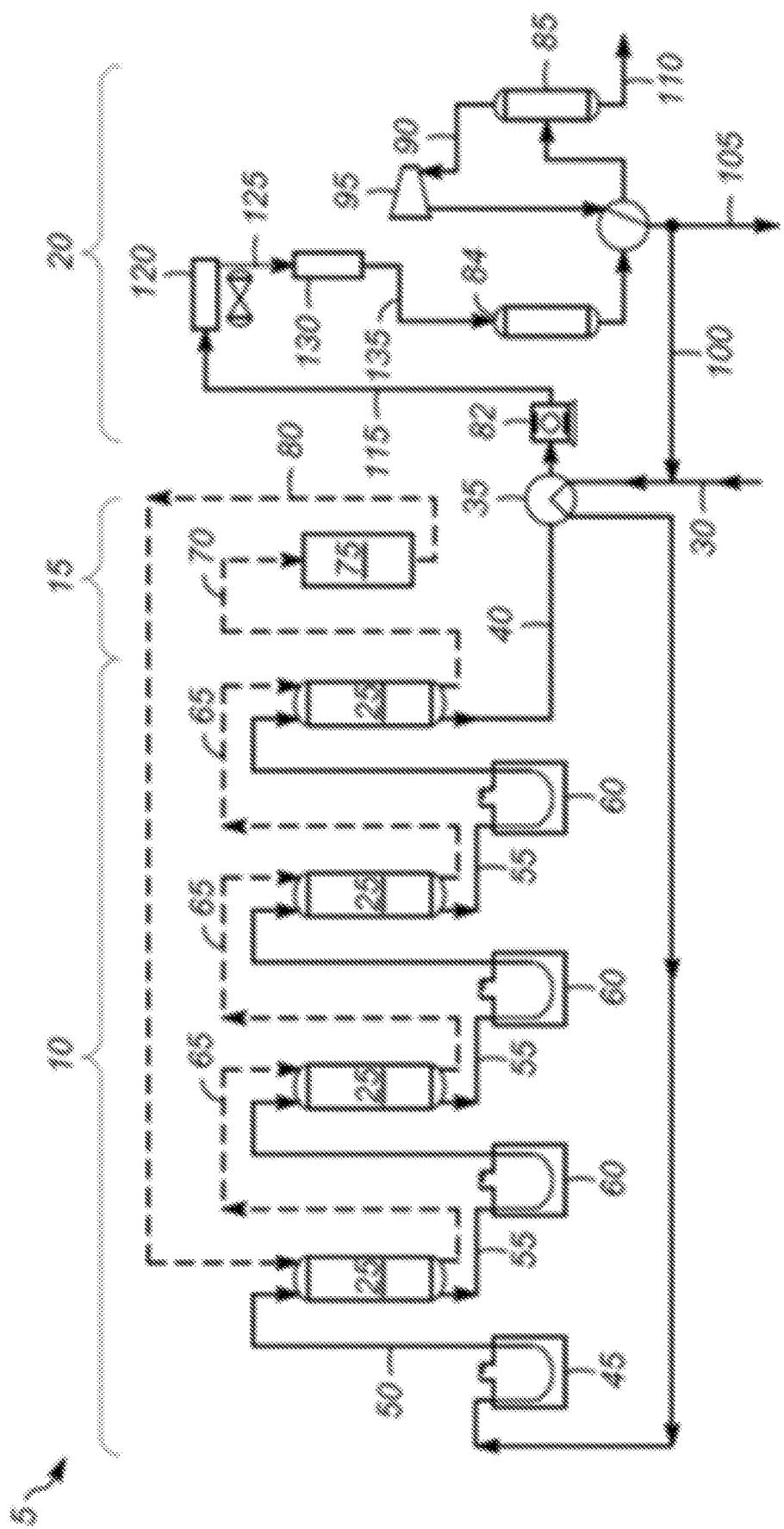
FIG. 1 depicts an illustrative catalytic dehydrogenation process with continuous catalyst regeneration (CCR) using a (vertically-oriented) hot combined feed-effluent (HCFE) exchanger in accordance with one or more example embodiments.

FIG. 1 depicts an illustrative arrangement for a catalytic dehydrogenation process 5. The process 5 may include a reactor section 10, a catalyst regeneration section 15, and a product recovery section 20. This process produces light olefins from their corresponding paraffin, for example, by dehydrogenation of propane, isobutane, or normal butane feedstocks separately or as mixtures.

The reactor section 10 includes one or more reactors 25. A feed 30 (e.g., including paraffinic $C_3$ and/or $C_4$ hydrocarbons) may be sent to a heat exchanger 35 where it exchanges heat with a reactor effluent 40 to raise the feed temperature. The feed 30 may be sent to a preheater 45 where it is heated to the desired inlet temperature. The preheated feed 50 may be sent from the preheater 45 to the first reactor 25. Because the dehydrogenation reaction is endothermic, the temperature of the effluent 55 from the first reactor 25 may be less than the temperature of the preheated feed 50, according to near-adiabatic operation. The effluent 55 may be sent to interstage heaters 60 to raise the temperature to the desired inlet temperature for the next reactor 25.

After the last reactor, the reactor effluent 40 may be sent to the heat exchanger 35, and heat is exchanged with the feed 30. The reactor effluent 40 may be then sent to the product recovery section 20. The catalyst 65 moves through the series of reactors 25. When the catalyst 70 leaves the last reactor 25, the catalyst 70 may be sent to the catalyst regeneration section 15. The catalyst regeneration section 15 may include a regenerator 75 where coke on the catalyst is burned off (through combustion with oxygen), and the catalyst may thereafter go through a reconditioning step. A regenerated catalyst 80 may be sent back to the first reactor 25.

The reactor effluent 40 may be compressed in a compressor 82 (e.g., a positive displacement compressor or centrifugal compressor). The compressed effluent 115 may be introduced to a cooler 120, e.g., a heat exchanger. The cooler 120 lowers the temperature of the compressed effluent. The cooled effluent 125 (cooled product stream) may be then introduced into a chloride remover 130, such as a chloride scavenging guard bed. The chloride remover 130 includes an adsorbent, which adsorbs chlorides from the cooled effluent 125 and provides a treated effluent 135. Treated effluent 135 may be introduced to a drier 84.

The dried effluent may be separated in separator 85. Gas 90 exiting the overhead of separator 85 may be expanded in expander 95 and separated into a recycle hydrogen stream 100 and a net separator gas stream 105. A liquid stream 110 exiting the bottoms of separator 85, the liquid stream 110 including the olefin product and unconverted paraffin, may be sent for further processing, where the desired olefin product may be recovered and the unconverted paraffin is recycled to the dehydrogenation reactor 25.

Sensors may be used to measure temperature (e.g., temperature sensors 1012), pressure (e.g., pressure sensors 1025, 1030), and/or flow of the process fluids (e.g., flow sensors 1022). Infrared cameras (e.g., thermal cameras 1017) mounted outside of equipment can continually take temperature measurements along different locations of the bundles and monitor temperature gradients. Sensor information may be gathered by one or more sensors and transmitted to data collection platform 1002. Data collection platform 1002 may transmit the collected sensor data to a data analysis platform 1004, which may be at a plant or remote from a plant (e.g., in the cloud).

References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

Catalyst

The reactor section may use catalyst to dehydrogenate the olefins to the paraffins. The conversion reaction may be endothermic. In one or more embodiments, conversion in the reactor may be adjusted by increasing or decreasing the reactor inlet temperatures (RITs) of the reactant feed. For example, heat may be supplied to a reactant feed through interstage heaters. RIT varies based on activity of the catalyst and the conditions in the reactor. For example, RIT may be adjusted to achieve a target production by a temperature controller (TIC) controlling input to the heater. For example, one or two TICs send a signal to control the fuel gas to the heater. If RIT is low, then the amount of fuel gas to the heater may be increased. If RIT is high, then the amount of fuel gas to the heater may be decreased.

For most of the lifetime of the catalyst, the activity of the catalyst may remain generally consistent. Eventually, the catalyst might not function efficiently and should be replaced with fresh catalyst. Fresh catalyst has a higher activity compared to older catalyst. If the higher activity of fresh catalyst is not taken into account when the catalyst is replaced, and the reactor is run at normal or steady-state conditions (e.g., normal RITs), then the fresh catalyst can become coked up and reactor screens become fouled. This can lead to delays in reaching design production and reduced run length of the unit.

Hence, the operating RITs should be adjusted to account for fresh catalyst. In one or more embodiments, systems may account for the higher activity of fresh catalyst by starting with lower RITs and slowly and gradually increasing over time, typically by controlling fuel into the reactant heater; but controlling this method relies on a moving inlet temperature target. Historically, it can take one to two months to ramp up the dehydrogenation process after spent catalyst has been replaced with fresh catalyst. This slow ramping process allows for catalyst activity to stabilize before allowing for steady state operation. During this ramp up time, RITs cannot be used to control conversion or product yield.

Deciding on the appropriate RIT is difficult with fresh catalyst, and in some systems may involve approximating the target RITs. Hence, the reaction must be carefully monitored to ensure that the conversion does not increase too fast to avoid coking and coke excursions. That is, setting reactor inlet temperatures to normal operating RITs without taking into account the higher activity of fresh catalyst will lead to coked up catalyst and fouled reactor screens. This leads to delays in reaching design production and reduces the run length of the unit.

The present disclosure solves problems that occur when relying on RIT to adjust the conversion. Instead of relying on RITs for reaction control during the ramp up process with fresh catalyst, the present disclosure contemplates a system, method, or apparatus that uses differential temperature (delta T) for reaction control. Delta temperature is the difference between the reactor inlet temperature (Ti) and the reactor outlet temperature (To). The optimal delta T may be determined for each individual reactor, and then the process in the reactor may be carried out so as to maintain the delta temperature. Delta Ts may be correlated with product yields, allowing design yields to be achieved much faster during ramp up. Thus, delta T may closely relate to conversion in the reactors regardless of the activity level in the catalyst because delta T may be calculated based on yield estimates. The delta T may be used to alter RIT as necessary to maintain the delta T.

Utilizing delta T to adjust reaction conditions instead of relying on RITs to adjust reaction conditions may allow the process to ramp up within a few catalyst cycles (e.g., one, two, three, four, five, six cycles) or about six to seven days, which may be significantly less time than the ramp-up might take when utilizing RITs. In addition, such ramp up may occur without coke excursions. For example, upon addition of fresh catalyst, the reactor may ramp up to 80% yield within one cycle, then 90% yield within the next cycle, and then 100% yield for each following cycle. Such accelerated ramp up improves efficiency and reduces time at lower throughput.

Figure 2:
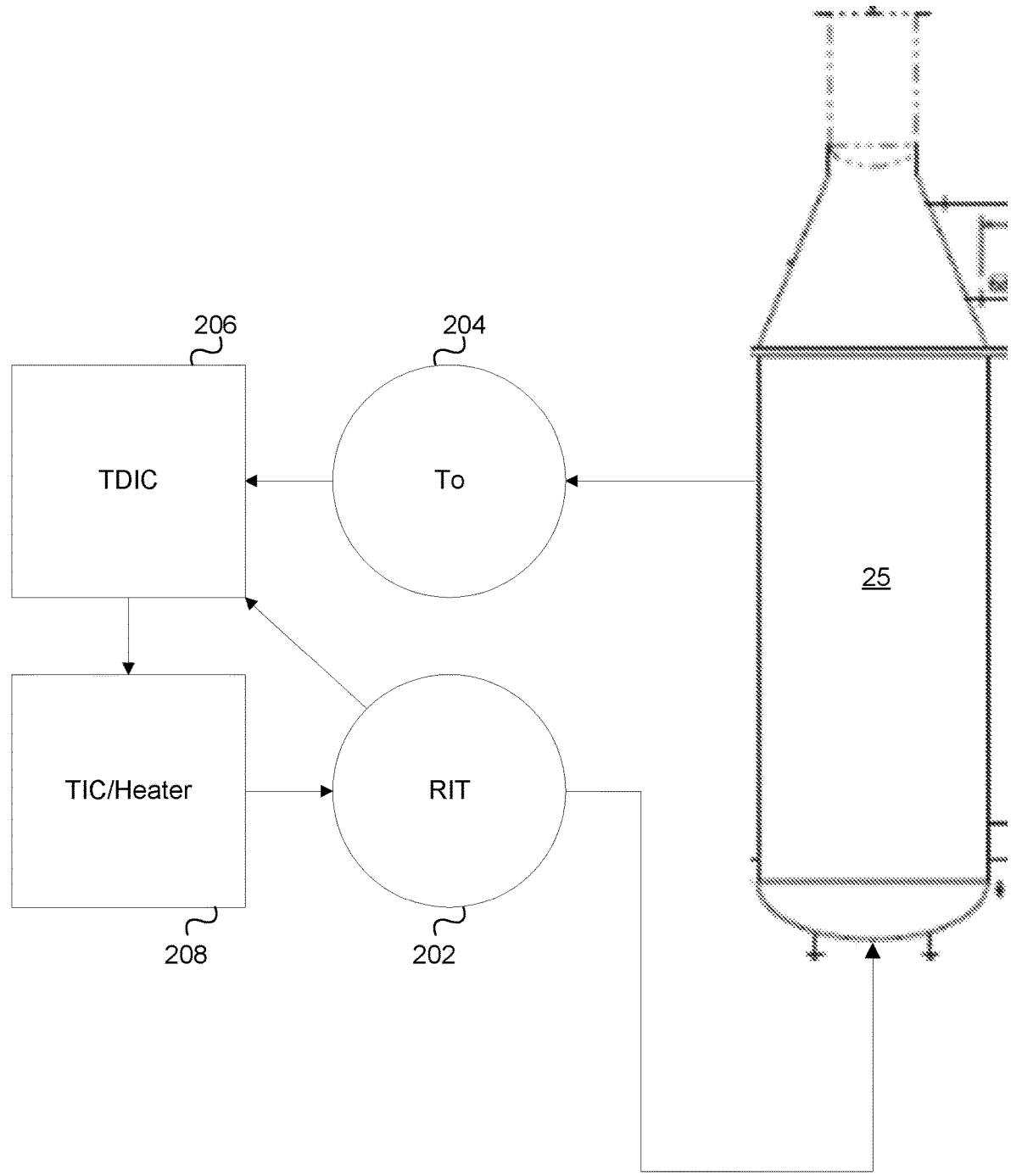
FIG. 2 depicts a schematic of a reactor with measurement and control of temperature in accordance with one or more example embodiments.

In one or more embodiments, a delta temperature controller (TDIC) may send a signal to TIC controllers to automatically change RIT(s) in order to maintain a preset or desired delta T. In the illustrative example of the simplified schematic of FIG. 2, reactor inlet temperature (RIT) 202 may be controlled by temperature inlet controller/heater (TIC/Heater 208). Reactor outlet temperature (To 204) may be measured. Based on this measurement, TDIC 206 may calculate the temperature delta between the RIT 202 and To 204. Based on whether the temperature delta is within the set point, TDIC 206 may instruct the TIC 208 to increase or decrease the RIT 202 (e.g., by adjusting the heat from a heater).

Because a delta temperature is utilized, in one or more embodiments, the system may autocorrect such that if the delta temperatures changes, e.g., drops off, the RIT will be automatically adjusted. For example, if the delta T is set at 50° C., the reactor may operate at an inlet temperature of 600° C. and an outlet temperature of 550° C. If the outlet temperature increases to 555° C., the system may automatically increase the feed temperature to 605° C. The system therefore maintains the 50 degree differential.

The present disclosure may allow ramp up of dehydrogenation units faster than previous methods, while ensuring that the catalyst does not coke up and/or foul the screens too quickly. The present disclosure may take into account catalyst activity and allows better control over production and run length of the unit. The present disclosure may help with operating the unit closer to the optimum conditions. The present disclosure may allow better control over the conversion in each reactor and may allow a ramp up and ramp down of the unit while maintaining an optimum delta temperature profile.

Limits may be placed on the system, such as maximum RIT and maximum coke levels. For example, the design RITs may be used as a limit to prevent a level from going too high on the inlet temperature in the event that there is an instrument failure or an operational issue. For the coke limit, one or more threshold or maximum values may be determined for each reactor, and in the event the levels exceed them, the coke (e.g., at Rx 4) would then potentially exceed the CCR's ability to burn it off. The system may automatically reduce severity in order to burn off the high coke.

In one or more embodiments, the optimal delta T for a ramp up reaction process may be determined by balancing objectives of the reaction process such as maximum production, best consumption, and/or acceptable conversion loss. For example, for the ramp plan, a system may ramp based on a percentage of the design delta temperatures and adjust the feed to the cold box accordingly. For normal operation, the system may use UNISIM and an algorithm to target an optimum delta temperature profile and report estimated RITs needed to achieve the target production. A target reactor delta T may be set, for example, based on the reported estimated RIT.

A reactor delta T may be a function of a reactor design for each unit. The delta T may depend on the type of catalysts, the recipe (reactants and amounts), the version of catalyst, and/or the type of dehydrogenation unit. Other parameters may be taken into account to determine delta T, such as pressure, feed rate, conversion, hydrogen:hydrocarbon ratio, catalyst conversion rate, reactor purge flow rates, stream compositions, DMDS injection rate, temperature, catalyst circulation rate, and/or coke levels. Delta T may be set based on particular objectives, such as high conversion or low propane consumption. Other objectives may include, for example, minimizing screen fouling or for potential process upsets.

In one or more embodiments, the present disclosure may be implemented as a control scheme for dehydrogenation reactions that utilize $C_3$, $C_3/C_4$ and $C_4$ feed streams. The system may automatically adjust the RIT to maintain the delta T. This approach may be used even if other parameters are adjusted such as pressure, conversion, H2/hydrocarbon ratio, or the like, since if adjusting any parameters affects the outlet temperature, the delta temperature controller will automatically measure the delta T and instruct the TIC to adjust the RIT. Thus, the control scheme may provide a robust system that maintains the production target.

Computer Platform System

A computer platform system may be utilized to collect and analyze coke data, estimate yields, check targets, monitor the entire system, flag anomalies, sound alarms, set parameters, and/or control process parameters such as feed rate, blow margin, maximum temperature, and/or coke variations. The system can set limits based on the parameters, e.g., maximum temperatures, maximum coke, etc. and set off alarms if such limits are exceeded. The system can be used as an estimating tool based on the customer objectives and economics of unit. The system can recommend a delta T and send commands to a delta temperature controller, which controls the delta T across the reactor by sending a remote set point to heater outlet TICs. For a single cell design, the output may go to the single heater outlet TIC. For a dual zone design, the output may be distributed to both outlet TICs. An optimization package may be provided to run a yield estimating program.

The system can predict the delta T profile based on the desired production rate and the system may then adjust the actual delta T's to target the recommended profile. For example, the system may determine a recommended delta T based on coke amounts. If the amount of coke goes up, delta T may drop. The system can provide delta T profiles for high consumption or low consumption and set limits such as RIT limits. The system can utilize online feedback to address issues. For example, if delta T cannot be met, the system could troubleshoot why delta T is not being met, such as determining if there is a faulty temperature probe.

The present disclosure may be utilized within a computing system environment for a dehydrogenation plant. The computing system environment may include a data collection platform 1002, a data analysis platform 1004, and/or a control platform 1006. An illustrative example of a suitable computing system environment is shown in FIGS. 3A-3E.

Figure 3A:
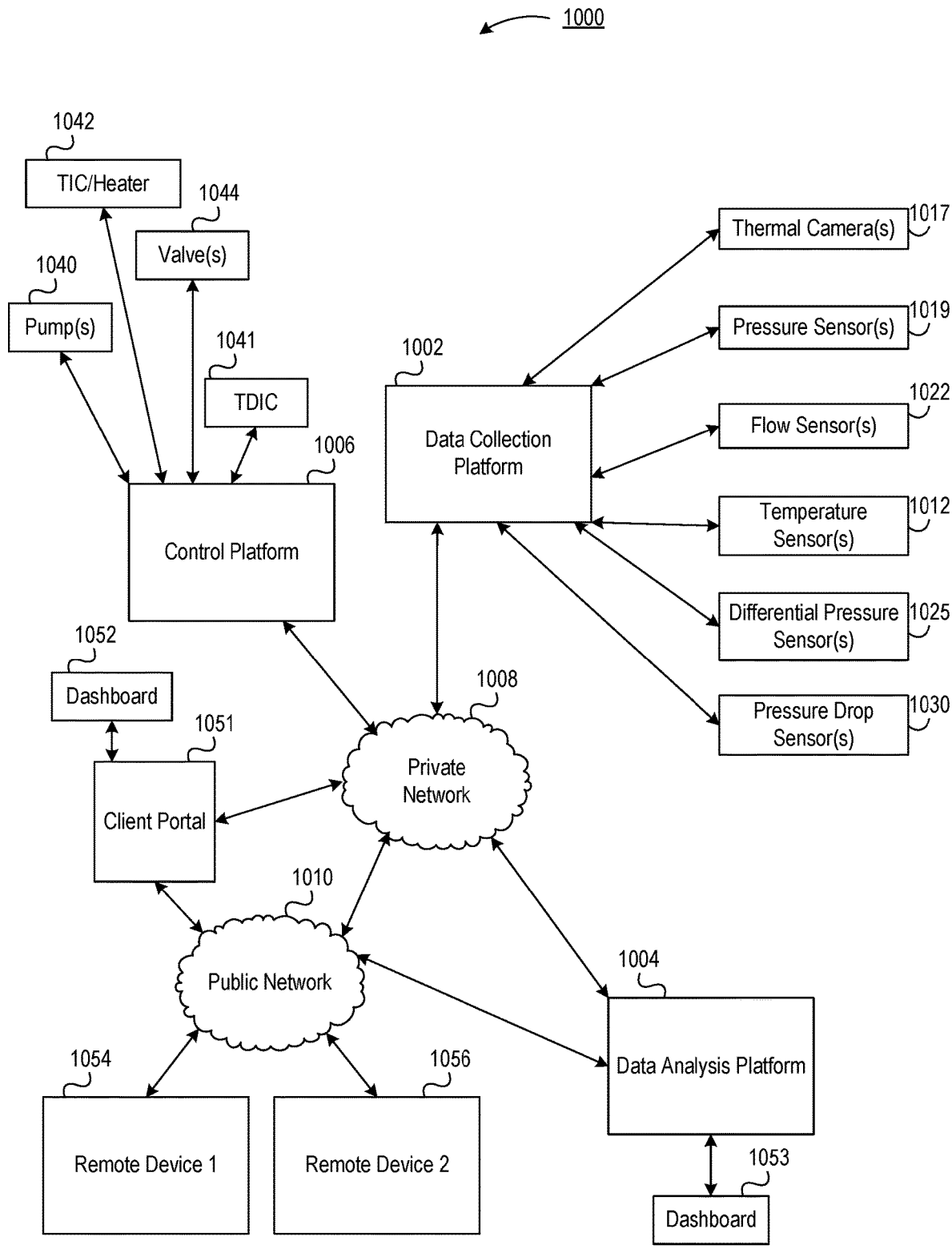
FIG. 3A depicts an illustrative computing environment for managing the addition of fresh catalyst in a dehydrogenation process in a plant in accordance with one or more example embodiments.

Turning to FIG. 3A, sensor data may be collected by a data collection platform (e.g., data collection platform 1002). The sensors may interface with data collection platform 1002 via wired or wireless transmissions. Sensor data (e.g., temperature data) may be collected continuously or at random or recurring periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. Data collection platform 1002 may continuously, sporadically, or periodically (e.g., every second, every minute, every hour, every day, once a week, once a month) transmit collected sensor data to a data analysis platform 1004, which may be nearby or remote from data collection platform 1002.

Figure 3B:
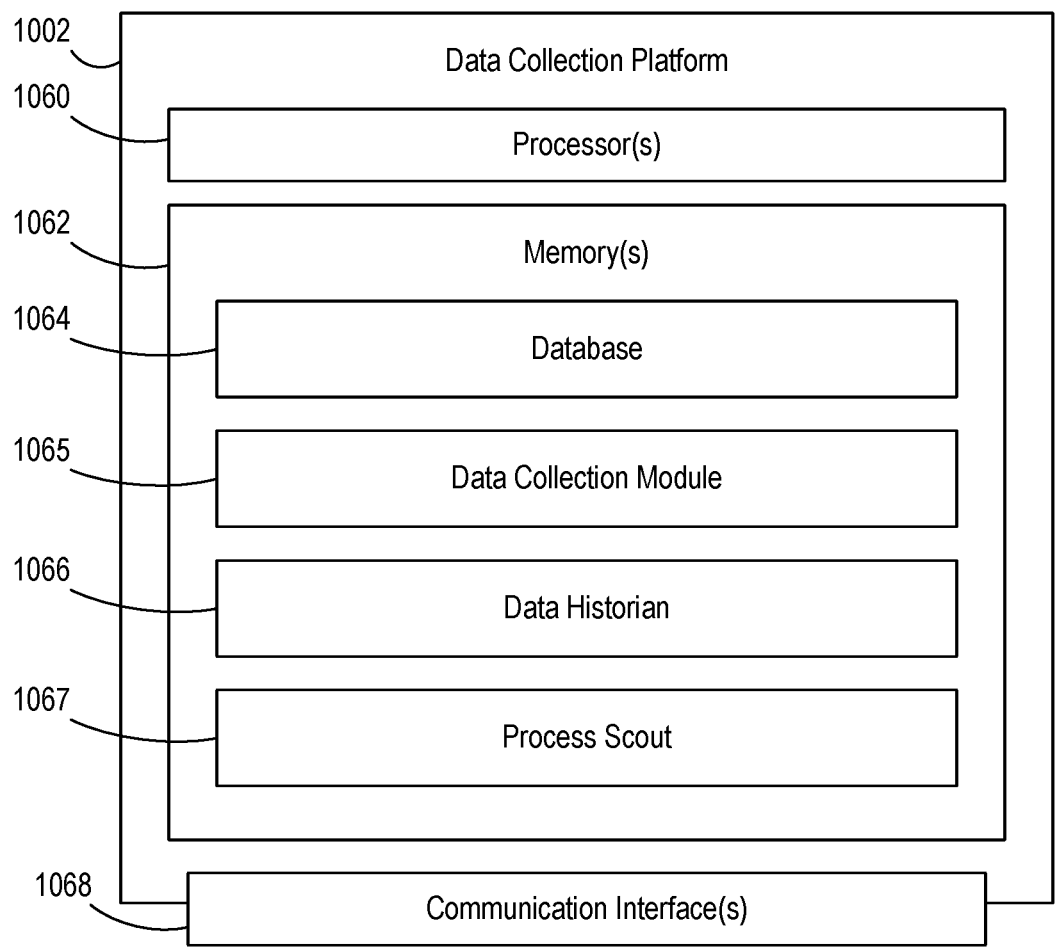
FIG. 3B depicts an illustrative data collection computing platform for collecting data related to the addition of fresh catalyst in a dehydrogenation process in a plant in accordance with one or more example embodiments.
Figure 3C:
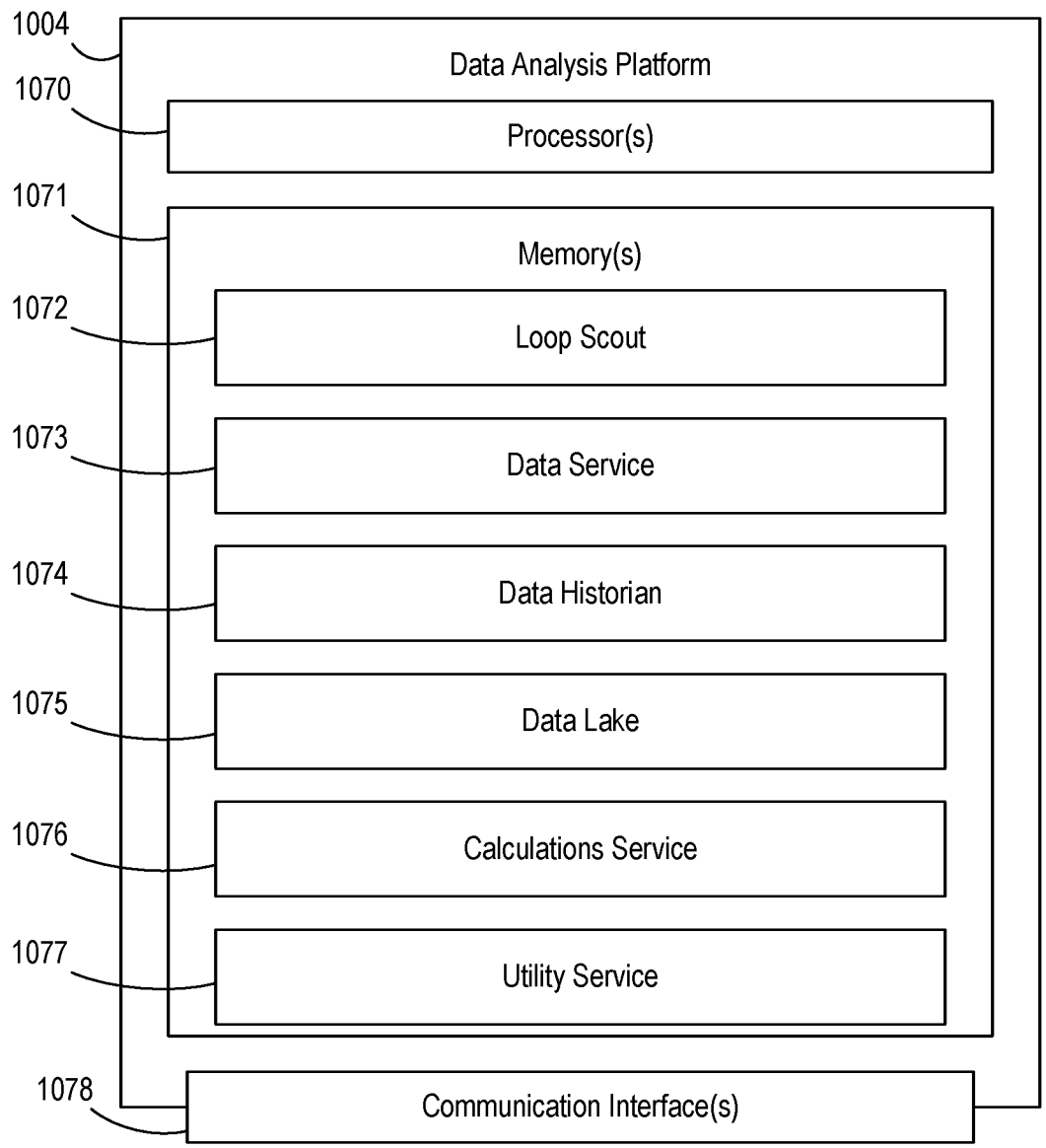
FIG. 3C depicts an illustrative data analysis computing platform for analyzing data related to the addition of fresh catalyst in a dehydrogenation process in a plant in accordance with one or more example embodiments.
Figure 3D:
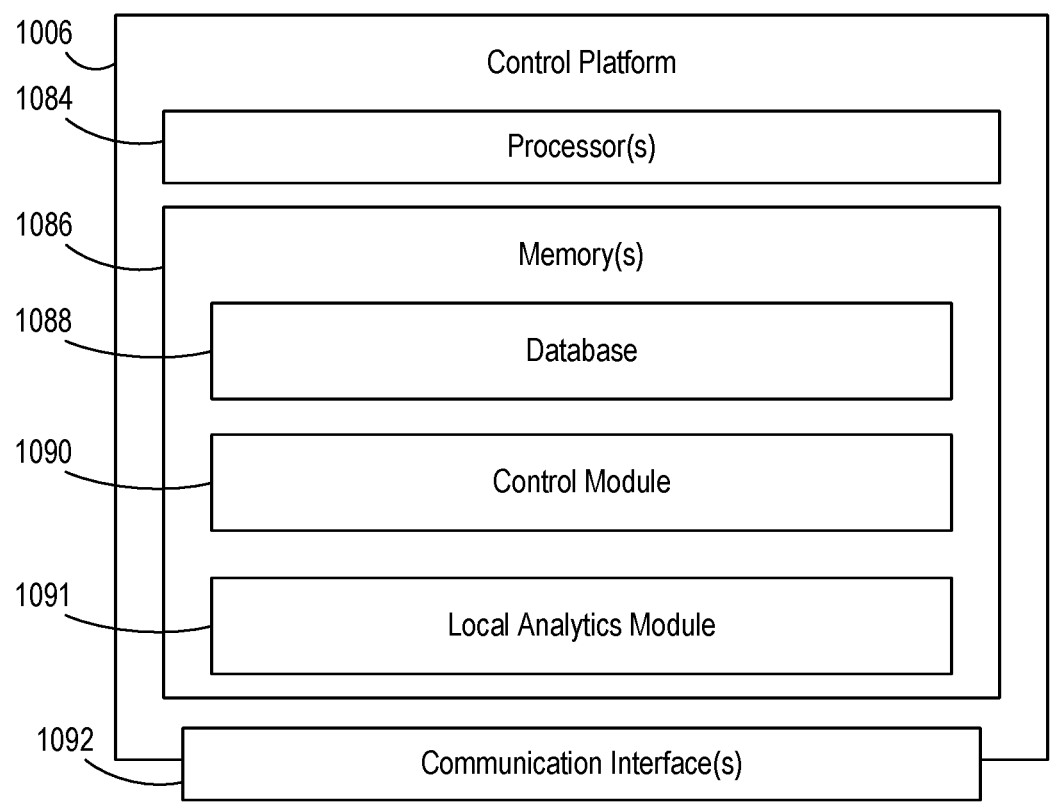
FIG. 3D depicts an illustrative data analysis computing platform for analyzing data related to the addition of fresh catalyst in a dehydrogenation process in a plant in accordance with one or more example embodiments.
Figure 3E:
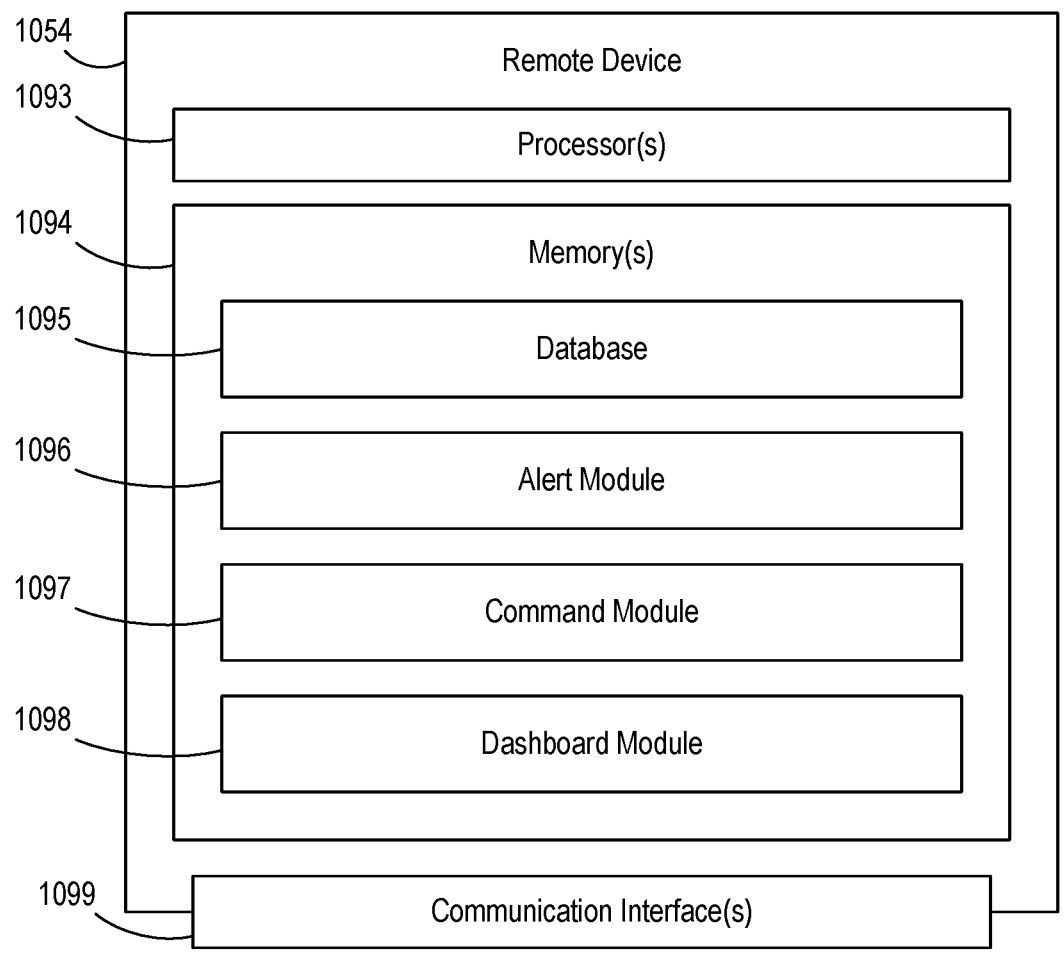
FIG. 3E depicts an illustrative control computing platform for controlling one or more parts of addition of fresh catalyst in a dehydrogenation process in a plant in accordance with one or more example embodiments.

The computing system environment 1000 of FIG. 3A includes logical block diagrams of numerous platforms and devices that are further elaborated upon in FIG. 3B, FIG. 3C, FIG. 3D, and FIG. 3E. FIG. 3B is an illustrative data collection platform (e.g., data collection platform 1002). FIG. 3C is an illustrative data analysis platform (e.g., data analysis platform 1004). FIG. 3D is an illustrative control platform (e.g., control platform 1006). FIG. 3E is an illustrative remote device (e.g., first remote device 1054, second remote device 1056). These platforms and devices of FIG. 3 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

In addition, the platform and/or devices in FIG. 3 may include one or more memories include any of a variety of computer-readable media. Computer-readable media may be any available media that may be accessed by data collection platform 1002, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by data collection platform 1002. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 3 may include one or more communication interfaces including, but not limited to, a microphone, keypad, touch screen, and/or stylus through which a user of a computer (e.g., first remote device 1054, second remote device 1056) may provide input, and may also include a speaker for providing audio output and a video display device for providing textual, audiovisual and/or graphical output. The communication interfaces may include a network controller for electronically communicating (e.g., wirelessly or wired) over public network 1010 or private network 1008 with one or more other components on the network. The network controller may include electronic hardware for communicating over network protocols, including TCP/IP, UDP, Ethernet, and other protocols.

In some examples, one or more sensor devices in FIG. 3A may be enhanced by incorporating functionality that may otherwise be found in a data collection platform (e.g., data collection platform 1002). These enhanced sensor system may provide further filtering of the measurements and readings collected from their sensor devices. For example, with some of the enhanced sensor systems in the operating environment illustrated in FIG. 3A, an increased amount of processing may occur at the sensor so as to reduce the amount of data needing to be transferred over private network 1008 in real-time to a computing platform. The enhanced sensor system may filter at the sensor itself the measured/collected/captured data and only particular, filtered data may be transmitted to data collection platform 1002 for storage and/or analysis.

Referring to FIG. 3B, in one example, a data collection platform (e.g., data collection platform 1002) may include a processor 1060, one or more memories 1062, and communication interfaces 1068. The memory may include a database 1064 for storing data records of various values collected from one or more sources. In addition, a data collection module 1065 may be stored in the memory and assist the processor in data collection platform 1002 in communicating with, via communications interface 1068, one or more sensor, measurement, and data capture systems, and processing the data received from these sources. In some embodiments, data collection module 1065 may include computer-executable instructions that, when executed by the processor, cause data collection platform 1002 to perform one or more of the steps disclosed herein. In other embodiments, data collection module 1065 may be a hybrid of software-based and/or hardware-based instructions to perform one or more of the steps disclosed herein. In some examples, data collection module 1065 may assist an enhanced sensor system with further filtering the measurements and readings collected from the sensor devices. Although the elements of FIG. 3B are illustrated as logical block diagrams, the disclosure is not so limited. In particular, one or more of the logical boxes in FIG. 3B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box.

For example, while database 1064 in FIG. 3B is illustrated as being stored inside one or more memories 1062 in data collection platform 1002, FIG. 3B contemplates that database 1064 may be stored in a standalone data store communicatively coupled to data collection module 1065 and processor 1060 of data collection platform 1002 via communications interface 1068 of data collection platform 1002.

In addition, data collection module 1065 may assist processor 1060 in data collection platform 1002 in communicating with, via communications interface 1068, and processing data received from other sources, such as data feeds from third-party servers and manual entry at the field site from a dashboard graphical user interface (e.g., dashboard 1052 of client portal 1051). For example, a third-party server may provide contemporaneous weather data to data collection module 1065. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas may have different stresses than a chemical plant in Montana. In another example, data manually entered from a dashboard graphical user interface (or other means) may be collected and saved into memory by the data collection module. Production rates may be entered and saved in memory. Tracking production rates may indicate issues with coking and/or plugging.

Referring to FIG. 3C, in one example, a data analysis platform (e.g., data analysis platform 1004) may include a processor 1070, one or more memories 1071, and communication interfaces 1078. Memory 1071 may include a data service 1073, data historian 1074, and/or data lake 1075, which may be used for receiving, processing, analyzing, and/or storing data records of various values collected or received from one or more sources. One or more of data service 1073, data historian 1074, and data lake 1075 may communicatively couple with the database 1064 of data collection platform 1002 via communication interface 1078 of data analysis platform 1004. At least one advantage of sharing data records, a database, or data services between the two platforms is the reduced memory requirements due to not duplicating the same or similar data. In addition, a calculations service 1076 and a utility service 1077 may be stored in memory 1071 and assist processor 1070 in data analysis platform 1004 in processing and analyzing the data values stored in data lake 1075. In some embodiments, calculations service 1076 and/or utility service 1077 may include computer-executable instructions that, when executed by processor 1070, cause data analysis platform 1004 to perform one or more of the steps disclosed herein. In other embodiments, calculations service 1076 and/or utility service 1077 may be a hybrid of software-based and/or hardware-based instructions to perform one or more of the steps disclosed herein. In some embodiments, calculations service 1076 and/or utility service 1077 may perform statistical analysis, predictive analytics, and/or machine learning on the data values in data lake 1075 to generate predictions and models. For example, data analysis platform 1004 may analyze sensor data to monitor delta T and/or reactor inlet temperature and control a ramp up or ramp down period in the equipment of a plant. Data analysis platform 1004 may receive and analyze temperature or other data from different dates to determine if changes are occurring. Such comparisons may be made on a monthly, weekly, daily, hourly, real-time, or some other basis.

Referring to FIG. 3C, utility service 1077 in data analysis platform 1004 may generate recommendations for adjusting one or more parameters for the operation of the plant environment depicted in FIG. 3A. In one or more embodiments, utility service 1077 may generate command codes that may be transmitted, via communications interface 1078, to cause adjustments or halting/starting of one or more operations in the plant environment. The command codes may be transmitted to a control platform (e.g., control platform 1006) for processing and/or execution. In an alternative embodiment, the command codes may be directly communicated, either wirelessly or in a wired fashion, to physical components at the plant such that the physical components include an interface to receive the commands and execute on them.

In one or more embodiments, data analysis platform 1004 may provide information via a graphical user interface (e.g., dashboard 1053), which may be accessible over a network (e.g., public network 1010). Dashboard 1053 may depict current, past, or projected future reactor inlet temperature, current, past, or projected reactor outlet temperature, current, past, or projected delta T, current, past, or projected heater temperature, or the like. In one or more embodiments, data analysis platform may generate a display of a difference between the current delta temperature and a design delta temperature of the reactor unit on a dashboard outlining at least one recommendation for an adjustment of the reactor inlet temperature of the reactor unit. The dashboard may include an option that, when selected, causes a command to be generated and sent (e.g., to control platform 1006) to automatically adjust the reactor inlet temperature of the dashboard (e.g., by adjusting a heater temperature).

Although the elements of FIG. 3C are illustrated as logical block diagrams, the disclosure is not so limited. In particular, one or more of the logical boxes in FIG. 3C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while data lake 1075 is visually depicted in FIG. 3C as being stored inside one or more memories 1071 in data analysis platform 1004, FIG. 3C contemplates that data lake 1075 may be stored in a standalone data store communicatively coupled to calculations service 1076 and processor 1070 of data analysis platform 1004 via communications interface 1078 of data analysis platform 1004. Furthermore, the data from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 3D, in one example, control platform 1006 may include a processor 1084, one or more memories 1086, and communication interfaces 1092. Memory 1086 may include a database 1088 for storing data records of various values transmitted from a user interface, computing device, data analysis platform 1004, data collection platform 1002, or other platform. The values may include parameter values for particular equipment at the plant. For example, some illustrative equipment at the plant that may be configured and/or controlled by control platform 1006 includes, but is not limited to, one or more valves 1044, one or more temperature controllers (e.g., TIC/heater 1042), one or more heaters, one or more delta temperature controllers (e.g., TDIC 1041), one or more pumps 1040, and/or other plant equipment, as described herein. In addition, a control module 1090 may be stored in memory 1086 and assist processor 1084 in control platform 1006 in receiving, storing, and transmitting the data values stored in database 1088. In some embodiments, control module 1090 may include computer-executable instructions that, when executed by processor 1084, cause control platform 1006 to perform one or more of the steps disclosed herein. In other embodiments, control module 1090 may be a hybrid of software-based and/or hardware-based instructions to perform one or more of the steps disclosed herein.

In a plant environment such as illustrated in FIG. 3A, if sensor data is outside of a safe range, this may be cause for immediate danger. As such, there may be a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated or received by the alert module in FIG. 3E.

Referring to FIG. 3E, in one example, a remote device (e.g., first remote device 1054) may include a processor 1093, one or more memories 1094, and communication interfaces 1099. Memory 1094 may include a database 1095 for storing data records of various values entered by a user or received through communications interface 1099. In addition, an alert module 1096, command module 1097, and/or dashboard module 1098 may be stored in memory 1094 and assist processor 1093 in processing and analyzing the data values stored in database 1095. In some embodiments, the aforementioned modules may include computer-executable instructions that, when executed by processor 1093, cause the remote device to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a dangerous condition or even merely a warning condition due to odd sensor readings. The alerts may indicate a change in temperature, a yield of a process, a change in recommended reactor inlet temperature or reactor outlet temperature, or the like. Command module 1097 in the remote device may generate a command that, when transmitted through communications interface 1099 to the platforms at the plant, causes adjustment of one or more parameter operations of the plant environment depicted in FIG. 3A. In some embodiments, dashboard module 1098 may display a graphical user interface to a user of the remote device to enable the user to enter desired parameters and/or commands. Dashboard module 1098 may receive parameters and/or commands via the graphical user interface. These parameters and/or commands may be transmitted to command module 1097 to generate the appropriate resulting command codes that may be then transmitted, via communications interface 1099, to cause adjustments or halting/starting of one or more operations in the plant environment. The command codes may be transmitted, for example, to control platform 1006 for processing and/or execution. In an alternative embodiment, the command codes may be directly communicated, either wirelessly or in a wired fashion, to physical components at the plant such that the physical components include an interface to receive the commands and execute them.

Although FIG. 3E is not so limited, in some embodiments the remote device may include a desktop computer, a smartphone, a wireless device, a tablet computer, a laptop computer, and/or the like. The remote device may be physically located locally or remotely, and may be connected by one of communications links to a public network (e.g., public network 1010) that is linked via a communications link to a private network (e.g., private network 1008). The network used to connect the remote device may be any suitable computer network, such as the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 3E are illustrated as logical block diagrams, the disclosure is not so limited. In particular, one or more of the logical boxes in FIG. 3E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while database 1095 is visually depicted in FIG. 3E as being stored inside one or more memories 1094 in the remote device, FIG. 3E contemplates that database 1095 may be stored in a standalone data store communicatively coupled, via communications interface 1099, to the modules stored at the remote device 1054 and processor 1093 of the remote device.

Referring to FIG. 3A, in some examples, the performance of operation in a plant may be improved by using a cloud computing infrastructure and associated methods, as described in U.S. Patent Application Publication No. US2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and/or frequent analysis of predicted versus actual performance may further allow early identification of operational discrepancies which may be acted upon to optimize impact, including financial or other impact.

The aforementioned cloud computing infrastructure may use a data collection platform (e.g., data collection platform 1002) associated with a plant to capture data, e.g., sensor measurements, which may be automatically sent to the cloud infrastructure, which may be remotely located, where the data may be reviewed to, for example, eliminate errors and biases, and used to calculate and report performance results. The data collection platform (e.g., data collection platform 1002) may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may be corrected for measurement issues (e.g., an accuracy problem for establishing a simulation steady state) and overall mass balance closure to generate a duplicate set of reconciled plant data. The corrected data may be used as an input to a simulation process, in which the process model may be tuned to ensure that the simulation process matches the reconciled plant data. An output of the reconciled plant data may be used to generate predicted data using a collection of virtual process model objects as a unit of process design.

The performance of the plant and/or individual process units of the plant may be compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. For example, the system may determine an optimum delta T. Based on the measured process conditions, the process model may recommend increasing RIT if delta T is not being met. Then, an operator and/or control platform 1006 may increase the RIT. In one or more embodiments where control platform 1006 automatically adjusts the RIT, a more exact temperature control and/or a faster response time may be achieved. The system may store a value defining a maximum RIT.

Data analysis platform 1004 may include an analysis unit that determines operating status, based on at least one of a kinetic model, a parametric model, an analytical tool, and/or a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. In another example, the analysis unit may establish a boundary or threshold of an operating parameter of the plant based on at least one of an existing limit and/or an operation condition. In yet another example, the analysis unit may establish a relationship between at least two operational parameters related to a specific process for the operation of the plant. Finally, in yet another example, one or more of the aforementioned examples may be performed with or without a combination of any number of the other examples.

The plant process model predicts plant performance that is expected based upon the plant operation information. The plant process model results can be used to monitor the health of the plant and to determine whether any upset or poor measurement occurred. The plant process model may be generated by an iterative process that models at various plant constraints to determine the desired plant process model.

The analytics unit may be partially or fully automated. In one or more embodiments, the system may be performed by a computer system, such as a third-party computer system, remote from the plant and/or the plant planning center. The system may receive signals and parameters via the communication network, and display in real-time related performance information on an interactive display device accessible to an operator or user. The web-based platform may allow multiple users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Figure 4:
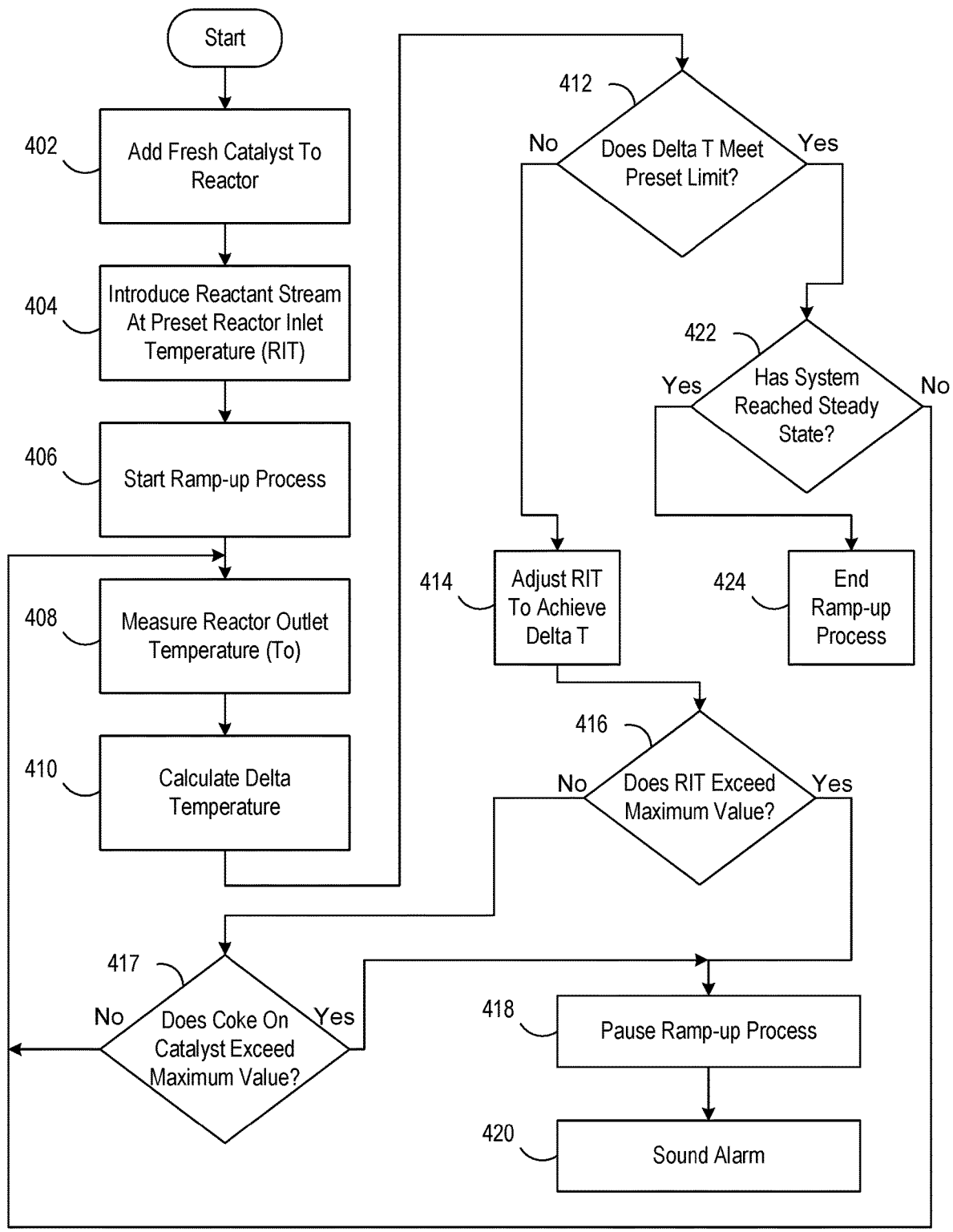
FIG. 4 depicts an illustrative flowchart of a process that one or more devices may perform for adding fresh catalyst in a dehydrogenation process in accordance with one or more example embodiments.

FIG. 4 depicts an illustrative simplified flow chart for a fresh catalyst ramp-up process, in accordance with one or more embodiments. The process starts by adding fresh catalyst to the reactor (402). A preheated reactant stream may be introduced to the reactor at an initial or preset RIT (404). The ramp-up process then starts (406). The process may be allowed to run with product exiting the reactor. After a preset amount of time, the reactor outlet temperature To may be measured (408). The delta temperature (delta T) may be calculated (410) by subtracting To from RIT (delta T=RIT−To). The system may determine whether delta T meets a predetermined or preset value (e.g., based on desired yield) (412). If delta T does not meet the predetermined or preset value, then the RIT may be adjusted to achieve delta T (414). For example, if the reactor delta T is below the target, the system may slowly increase the RIT to achieve the delta T. To adjust the RIT, for example, the system may send a command to adjust a heater temperature. After adjusting the RIT, the system may determine whether the RIT has exceeded a maximum value (e.g., exceeds a threshold value) (416). If the RIT maximum value has not been exceeded, the system may determine whether coke on the catalyst exceeds a maximum value (e.g., exceeds a threshold value) (417). If coke on the catalyst does not exceed the maximum value, the reactor outlet temperature To may be measured again (408). If a maximum value has been exceeded (e.g., an RIT maximum value and/or a coke on the catalyst maximum value), the ramp-up Process may be paused (418) and/or an alarm may be sounded (420). If delta T does meet the preset value (412), then the system may determine whether the system has reached a steady state (422). If the system has not reached a steady state, the reactor outlet temperature To may be measured again (408). If the system has reached a steady state, then the ramp-up process may be ended (424).

FIG. 5 depicts an illustrative example of a dashboard that may be used in a dehydrogenation process in accordance with one or more example embodiments. A dashboard 500 may include one or more rows corresponding to one or more reactors. The dashboard may include a target reactor delta T for each reactor. For example, the target reactor delta T may be based on a design of the reactor, a historical reactor delta T, a delta T corresponding to an optimum production level for that reactor, or the like. The target reactor delta T may be different for each reactor, or may be the same for one or more reactors.

The dashboard may include one or more operating variables, such as a reactor delta T, an RIT, and/or a coke level. The operating variables may be displayed in association with a particular reactor (e.g., for four reactors, four RITs may be displayed). The operating variables may display a latest sensor reading (which may be an aggregate reading determined from one or more sensors for a particular reactor) corresponding to the operating variable for an associated reactor. The latest sensor reading may be a real-time or substantially real-time sensor reading. The dashboard may be interactive (e.g., if a user selects a particular variable, a display of multiple recent values of that variable may be displayed, such as in a new window or a pop-up window).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A system comprising:
   at least two sensors configured to measure operating information in a catalytic reactor unit, wherein the at least two sensors comprise at least one reactor inlet temperature sensor and at least one reactor outlet temperature sensor;
   a data collection platform comprising:
      one or more processors of the data collection platform; and
      memory of the data collection platform, storing computer-readable instructions that, when executed, cause the data collection platform to:
         receive sensor data collected by the at least two sensors, the sensor data comprising reactor inlet temperature data and reactor outlet temperature data;
         correlate the sensor data with metadata comprising time data; and
         transmit the sensor data;
   a data analysis platform comprising:
      one or more processors of the data analysis platform; and
      memory of the data analysis platform, storing computer-readable instructions that, when executed, cause the data analysis platform to:
         receive the sensor data from the data collection platform;
         use the sensor data to determine a delta temperature based on the reactor inlet temperature data and reactor outlet temperature data; and
         based on the delta temperature, transmit a command for an adjustment to an operating temperature of a heater of the catalytic reactor unit; and
   a control platform comprising:
      one or more processors of the control platform; and
      memory of the control platform, storing computer-readable instructions that, when executed, cause the control platform to:

receive the command for the adjustment to the operating temperature of the heater of the catalytic reactor unit; and adjust the operating temperature of the heater of the catalytic reactor unit.

2. The system of claim 1, wherein the computer-readable instructions of the data analysis platform, when executed, cause the data analysis platform to:

use the sensor data and a process model associated with the catalytic reactor unit to run an optimization routine; and determine, based on the optimization routine, an optimum delta temperature for the catalytic reactor unit.

3. The system of claim 1, wherein the computer-readable instructions of the data analysis platform, when executed, cause the data analysis platform to:

determine that the delta temperature is above a threshold; and based on determining that the delta temperature is above the threshold, transmit the command for the adjustment to the operating temperature of the heater of the catalytic reactor unit.

4. The system of claim 1, wherein the computer-readable instructions of the data analysis platform, when executed, cause the data analysis platform to:

correlate the delta temperature with a product yield; and based on correlating the delta temperature with the product yield, determine an amount of the adjustment to the operating temperature of the heater of the catalytic reactor unit.

5. The system of claim 1, wherein the computer-readable instructions of the data analysis platform, when executed, cause the data analysis platform to:

determine a desired delta temperature; and send a signal configured to cause a controller to automatically change a reactor inlet temperature of the catalytic reactor unit in order to maintain the desired delta temperature.

6. The system of claim 1, wherein the computer-readable instructions of the data analysis platform, when executed, cause the data analysis platform to:

provide the sensor data and the delta temperature based on the reactor inlet temperature data and the reactor outlet temperature data to a dashboard.

7. The system of claim 6, wherein the computer-readable instructions of the data analysis platform, when executed, cause the data analysis platform to:

provide a past reactor inlet temperature to the dashboard;

provide a current reactor inlet temperature to the dashboard; and provide a projected future reactor inlet temperature to the dashboard.

8. The system of claim 6, wherein the computer-readable instructions of the data analysis platform, when executed, cause the data analysis platform to:

generate the dashboard, the dashboard comprising a display of a difference between a current delta temperature and a design delta temperature of the catalytic reactor unit.

9. The system of claim 6, wherein the computer-readable instructions of the data analysis platform, when executed, cause the data analysis platform to:

generate the dashboard, the dashboard comprising at least one recommendation for an adjustment of a reactor inlet temperature of the catalytic reactor unit.

10. A method comprising:

receiving, by a data analysis computing device, sensor data collected by at least two sensors associated with a reactor unit, the sensors comprising at least one reactor inlet temperature sensor and at least one reactor outlet temperature sensor;

based on the sensor data, determining, by the data analysis computing device, a current delta temperature representing a difference between a reactor inlet temperature of the reactor unit and a reactor outlet temperature of the reactor unit;

determining, by the data analysis computing device, a difference between the current delta temperature and a design delta temperature of the reactor unit;

based on the sensor data, determining, by the data analysis computing device, a recommended adjustment to the reactor inlet temperature of the reactor unit to reduce the difference between the current delta temperature and the design delta temperature;

generating a display of the difference between the current delta temperature and the design delta temperature on a dashboard, the dashboard comprising a display of the recommended adjustment to the reactor inlet temperature of the reactor unit; and sending a command configured to cause the recommended adjustment to the reactor inlet temperature of the reactor unit.

11. The method of claim 10, comprising:

using the sensor data and a process model associated with the reactor unit to run an optimization routine; and determining, based on the optimization routine, an optimum delta temperature for the reactor unit.

12. The method of claim 10, comprising:

determining that the delta temperature is above a threshold; and based on determining that the delta temperature is above the threshold, transmitting the command for the adjustment to an operating temperature of a heater of the reactor unit.

13. The method of claim 10, comprising:

correlating the delta temperature with a product yield; and based on correlating the delta temperature with the product yield, determining an amount of the adjustment to an operating temperature of a heater of the reactor unit.

14. The method of claim 10, comprising:

generating a dashboard comprising a display of a difference between a current delta temperature and a design delta temperature of the reactor unit.

15. A method of controlling a dehydrogenation reaction in a reactor during ramp up after addition of fresh catalyst, the method comprising:

determining, by a data analysis device comprising a processor and memory, a desired product yield for a reaction of a reactant associated with the reactor;

based on the desired product yield, calculating, by the data analysis device, a desired difference between a reactor inlet temperature of the reactant associated with the reactor and a reactor outlet temperature of a product at an outlet of the reactor;

initiating, by the data analysis device, a ramp up process for the reactor by setting the reactor inlet temperature to a preset value;

receiving, by the data analysis device, measurement information comprising the reactor outlet temperature of the product at the outlet of the reactor;

calculating, by the data analysis device, an actual difference between the reactor inlet temperature and the reactor outlet temperature; and after determining that the actual difference between the reactor inlet temperature and the reactor outlet temperature is not the desired difference between the reactor inlet temperature and the reactor outlet temperature, sending, by the data analysis device, a command configured to cause a reaction condition of the reactor to obtain the desired difference between the reactor inlet temperature and the reactor outlet temperature.

16. The method of claim 15, wherein the desired difference between the reactor inlet temperature and the reactor outlet temperature is obtained by adjusting the reactor inlet temperature.

17. The method of claim 15, comprising:
using sensor data and a process model associated with the reactor to run an optimization routine; and
determining, based on the optimization routine, an optimum delta temperature for the reactor.

18. The method of claim 15, comprising:
determining that a delta temperature is above a threshold; and
based on determining that the delta temperature is above the threshold, transmitting the command for the adjustment to an operating temperature of a heater of the reactor.

19. The method of claim 15, comprising:
correlating a delta temperature with a product yield; and
based on correlating the delta temperature with the product yield, determining an amount of the adjustment to an operating temperature of a heater of the reactor.

20. The method of claim 15, comprising:
generating a dashboard comprising at least one recommendation for an adjustment of the a reactor inlet temperature of the reactor.

* * * * *